(12) United States Patent
Holder

(10) Patent No.: US 8,662,486 B2
(45) Date of Patent: Mar. 4, 2014

(54) DOOR INSTALLATION APPARATUS

(75) Inventor: William J. Holder, Indianapolis, IN (US)

(73) Assignee: Door Helper, LLC, Indianapolis, IN (US)

(*) Notice: Subject to any disclaimer, the term of this patent is extended or adjusted under 35 U.S.C. 154(b) by 360 days.

(21) Appl. No.: 13/024,502

(22) Filed: Feb. 10, 2011

(65) Prior Publication Data

US 2011/0214274 A1 Sep. 8, 2011

Related U.S. Application Data

(60) Provisional application No. 61/310,155, filed on Mar. 3, 2010.

(51) Int. Cl.
*B25B 1/00* (2006.01)

(52) U.S. Cl.
USPC ........................................ 269/152

(58) Field of Classification Search
USPC .......... 29/559, 281, 1; 269/152; 280/79.7, 35; 414/10
See application file for complete search history.

(56) References Cited

U.S. PATENT DOCUMENTS

| 2,967,627 | A | * | 1/1961 | Vinson | 254/2 R |
| 5,280,090 | A | * | 1/1994 | Kurahashi et al. | 525/479 |
| 7,410,180 | B1 | * | 8/2008 | Nguyen et al. | 280/79.7 |
| 2008/0093811 | A1 | * | 4/2008 | Williams | 280/35 |

OTHER PUBLICATIONS

Motion Savers, www.theonlinecatalog.com, Feb. 9, 2010.
Door JAK, www.cescompany.com; Feb. 9, 2010.
Door JAK 50, www.contractors-solutions.net; Feb. 9, 2010.

* cited by examiner

*Primary Examiner* — John C Hong
(74) *Attorney, Agent, or Firm* — Overhauser Law Offices, LLC

(57) ABSTRACT

An apparatus to assist with door installation, transport, and removal comprising a telescoping frame, padded guides extending outwardly from the frame and defining a gap of the width of a door, friction-reducing members, a step plate, and brakes. In a vertical orientation, a door may be slid into the apparatus. The guides can incorporate a clamp and a strap used to secure the door to the frame and permit selective pivoting between the vertical orientation to a horizontal orientation. The horizontal orientation facilitates ergonomic sawing when hinges are being applied to a held door; afterwards, the apparatus can be moved to a door jamb and changed to vertical orientation for positioning so the unattached sides of the hinges abut the jamb. A method of using the apparatus is also disclosed.

12 Claims, 4 Drawing Sheets

DOOR INSTALLATION APPARATUS

CROSS-REFERENCE TO RELATED APPLICATION

This application claims the benefit of U.S. Provisional Patent Application No. 61/310,155, filed Mar. 3, 2010, which is incorporated herein by reference.

FIELD OF THE INVENTION

The present disclosure relates to doors for non-residential settings and, more particularly, to an apparatus to assist with the installation, removal, and transportation of same.

BACKGROUND

Doors, especially those which are solid-core or simply made from a hard wood such as oak, can be quite heavy and unwieldy to move and install, despite having holes pre-punched and mortised for a knob and hinges, respectively. The solid-core, hollow metal, and inlaid-glass doors so often installed in today's commercial, medical, government, and educational facilities are difficult for one or even two people to move, much less hang and install. Application of the requisite hinges to these types of doors is also problematic.

Previously, installation of a new commercial door, which may have a weight that exceeds one hundred pounds, required using a two-wheel cart or dolly, possibly one which was intended for drywall or was homemade. Yet a door placed on such a cart is apt to wobble and will hang off of one end, striking and dragging on the ground. Added difficulty lies in having to balance the door when moving it with a prior art contraption. Because protecting a new door from scratches is one of the utmost concerns, it is not feasible to haphazardly weld guides and/or a shaft to an existing hand cart for door transport.

Hinges are not usually installed on doors at the time of manufacture, so to attach them to doors has required a separate, horizontally-oriented device incorporating a system of supports and/or wedges. Once a hinge plate is attached to a door, the door must be placed back on a vertically-oriented, two-wheeled cart and awkwardly pushed to a door frame for final installation. There, the installer must carefully align the hinges with the door jamb.

Considerable problems can arise at this point in the door installation process: the installer must let go of the door when reaching for the necessary tools, though no screw connects it to the jamb at that point. Leaving, even if only temporarily, a heavy door precariously retained by an unscrewed top hinge set in its corresponding jamb pocket involves a significant risk of injury. A strong wind or even inadvertent slight contact can be enough to cause the door to fall. Accordingly, two or more people are often needed to install a door.

Challenges also exist when repairing or replacing a door. Often, a door frame will have come from the same manufacturer that made the door. Hinge placement, though, can vary from manufacturer to manufacturer. Thus, when attempting to install or repair a new door in an old frame, the installer must, for extended periods of time, direct his or her attention from preventing the door from falling, or at least getting scratched, and focus on measuring and double-checking to ensure that the door's hinges will precisely engage the pockets in the jamb, which may have been produced by a different manufacturer from that of the door.

SUMMARY OF THE DISCLOSURE

The present invention may comprise one or more of the following features and combinations thereof. An illustrative apparatus including a frame having upper and lower ends, with one or both ends having attached thereto one or more friction-reducing members and a pair of padded guides adapted to receive a door. The frame may include a telescoping shaft, having two or more members sliding into and out from one another and held by a system of mating holes and pins, to accommodate doors of different heights. One end of the frame has a releasable clamp for securely holding a door to the frame by applied pressure. An elastic strap supports the door-retention capability.

The apparatus may be employed in methods for door installation, transport, and removal. Vertical and horizontal apparatus orientations are possible, and a door may be transported using either orientation; the orientations may be toggled even as the apparatus holds a door, so long as the clamp and strap are utilized. The friction-reducing members may have brakes to prevent the apparatus from undesired movement. The horizontal orientation is ergonomically optimal when hinges are being fastened to a door, prior to installation in a jamb; this is because the user does not have to stretch upwardly, as would be required had the door been vertically situated, or bend deeply or awkwardly, as would be required had the door been resting on the floor or even on its side on a table. A step plate at the lower end facilitates, when the apparatus is in its vertical orientation, the insertion and removal of a door from the apparatus and supports a door once inserted. Optional handles are affixed to the telescoping shaft, preferably on the lower end, for added ease of transport.

The apparatus may be used for door installation and transport, and also removing a previously-installed door from a jamb for repair or replacement. The apparatus may also hold other large sheets of material, including drywall, plywood, and wood paneling. Additional features of the disclosure will become apparent to individuals skilled in the art upon consideration of the following detailed description of the illustrative embodiments.

BRIEF DESCRIPTION OF THE DRAWINGS

The detailed description particularly refers to the accompanying figures in which.

DESCRIPTION OF THE ILLUSTRATIVE EMBODIMENTS

Figure 1:
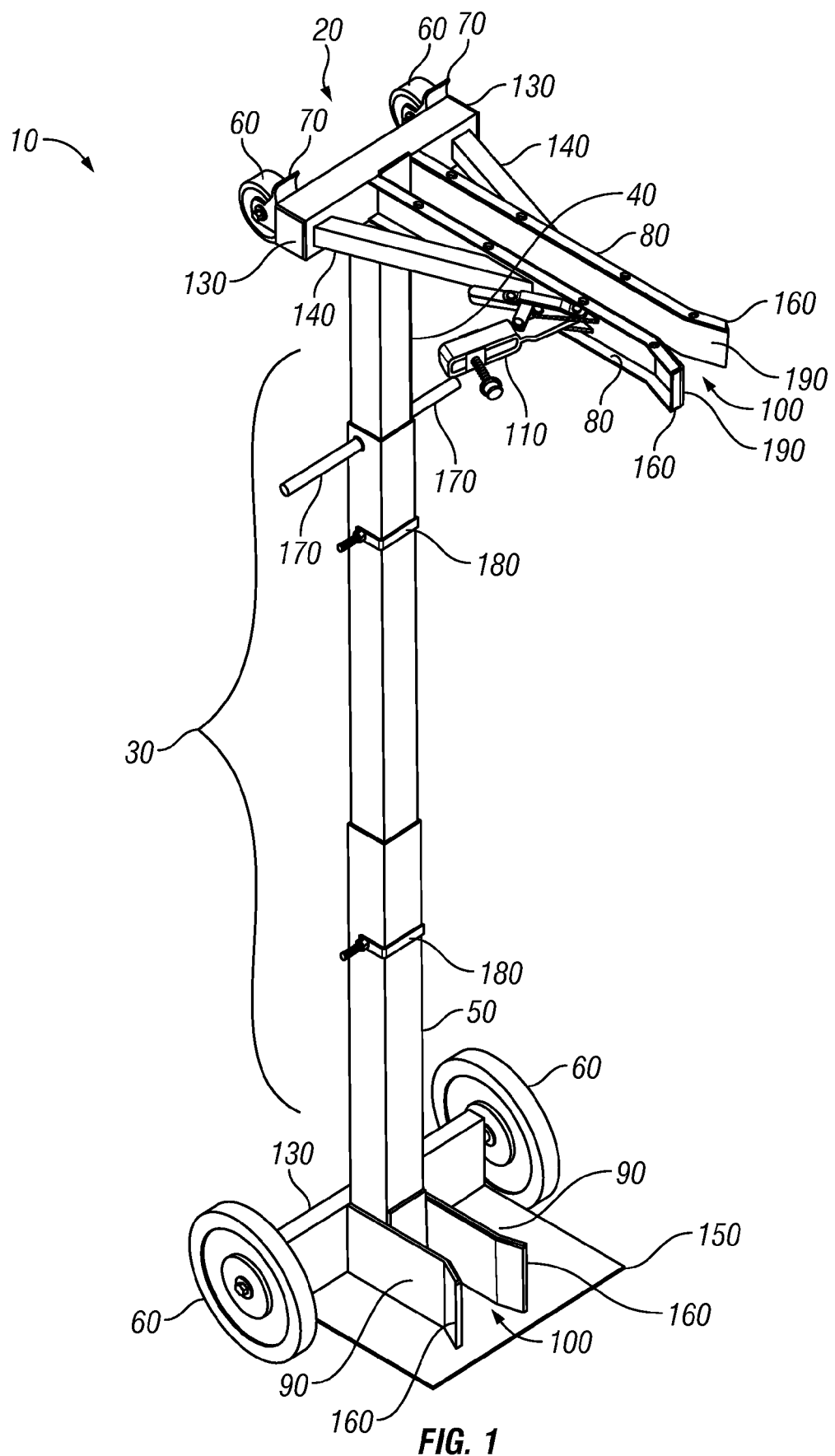
FIG. 1 is a perspective view of an illustrative apparatus to assist door transport, installation, and removal.

For the purposes of promoting and understanding the principles of the invention, reference will now be made to one or more embodiments illustrated in the drawings and specific language will be used to describe the same.

FIGS. 1 through 4 depict an illustrative apparatus 10 to assist with the transportation, installation, and removal of doors, particularly those for a non-residential location. In this particular embodiment, the apparatus 10 has a frame 20 consisting of a telescoping shaft 30 having an upper end 40 and a lower end 50, with friction-reducing members 60 rotationally affixed at both ends 40 and 50, and the friction-reducing members 60 at the upper end 40 having brakes 70. A pair of generally parallel, opposing guides 80 and 90, defining a gap 100 capable of receiving and accommodating only the width or shorter horizontal dimension, (as opposed to length or height), of an upright door (FIGS. 3 and 4) is attached at both the upper end 40 and the lower end 50 and extend outwardly therefrom. The upper end guides 80 feature a retaining member 110 (FIGS. 1 and 2) and an elastic strap 120 (FIG. 3) that are employed to apply pressure to an inserted door to secure it to the apparatus.

The friction-reducing members 60 at each end of the telescoping shaft 30, in the illustrative embodiment, are attached to the frame 20 by beams 130 which are generally orthogonal to the guides 80 and 90. The beams 130 at the upper end 40 of the frame 20 may include or be joined to angled struts 140 that are connected to the guides 80 and 90 and serve as supplementary door support.

The bottom portion of the frame 20 is connected to a step plate 150 positioned generally orthogonal to the shaft 30 and parallel with the guides 90. The step plate 150 facilitates keeping the apparatus 10 in a steady vertical orientation and secure retention of a door. In addition, the worker loading a door onto the apparatus 10 may stand on the step plate 150 for even more apparatus 10 stability and safety.

The apparatus 10 may be moved between the vertical and horizontal orientations by pivoting it about the friction-reducing members 60 of lower end 50. A retained door may be moved when the apparatus is in either orientation. In the vertical orientation, the longitudinal axis of the shaft 30 is generally orthogonal to the ground, while said axis will be generally parallel with the ground when the apparatus 10 is in its horizontal orientation.

Figure 4:
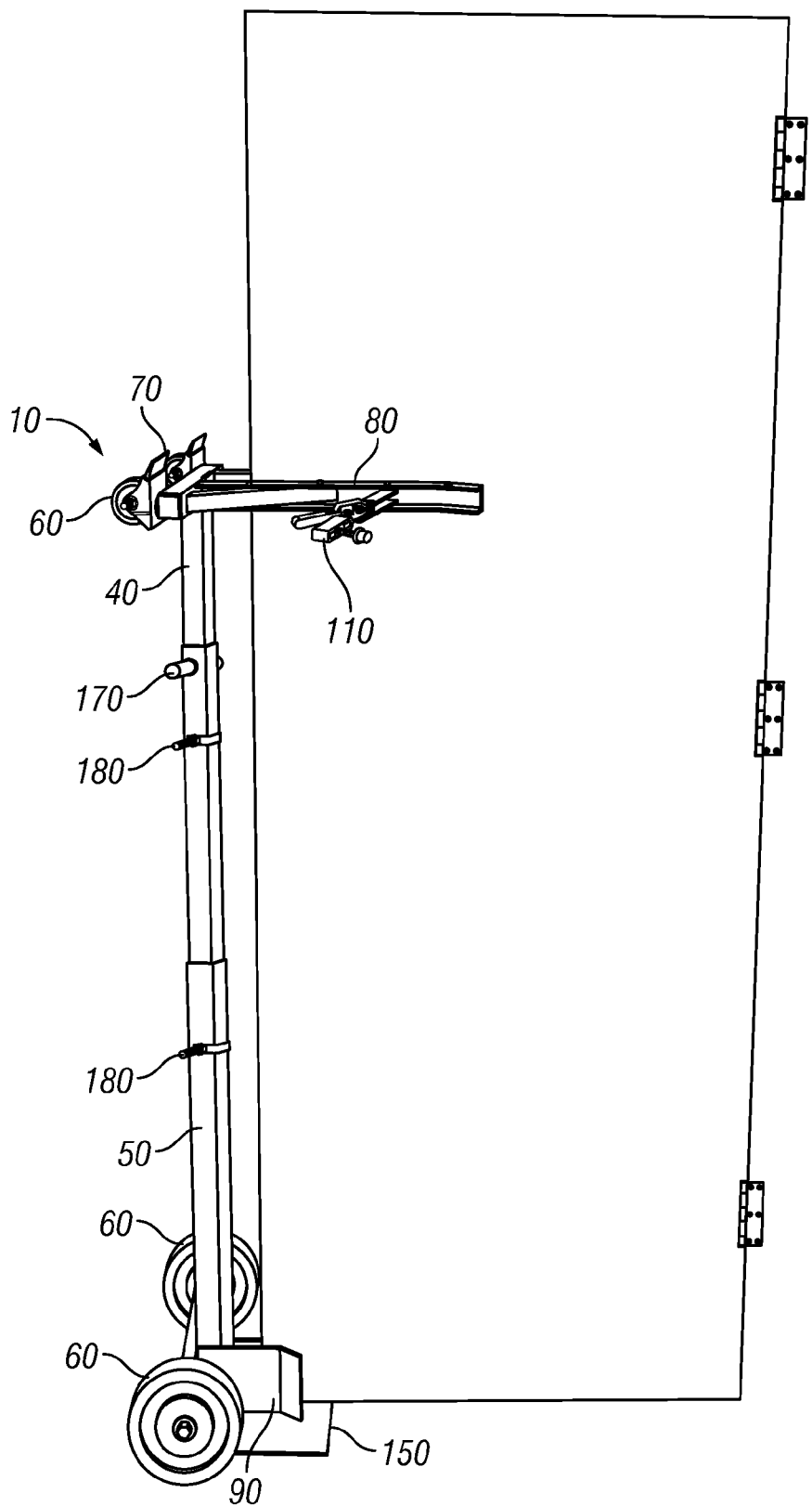
FIG. 4 is a side view of the apparatus of FIG. 1 holding a door while in the vertical orientation.

The process of loading a door onto the apparatus 10 is preferably done when the apparatus 10 is set vertically, the orientation shown in FIGS. 1 and 4. As may be seen in FIGS. 1 and 2, the upper end and lower end guides 80 and 90, respectively, in one embodiment may be canted outwardly at their ends 160 distal from the shaft 30 to aid the guiding of a door between them.

Once set into position on the apparatus 10, a door may be locked into place via the retaining member 110 and elastic strap 120. The retaining member 110 may be a clamp that applies inward pressure or virtually any other device capable of preventing door movement. In one illustrative embodiment, the retaining member 110 used at the upper end 40 is of a clamping force variety sufficient to hold 350 psi. Also, in one illustrative embodiment, the apparatus 10 uses a quickly-securing elastic strap 120 which does not require ratcheting, thereby saving time otherwise spent on numerous turns of a wrench or ensuring a non-elastic band's ratchet pawl has engaged a dip between the ratchet teeth.

Figure 2:
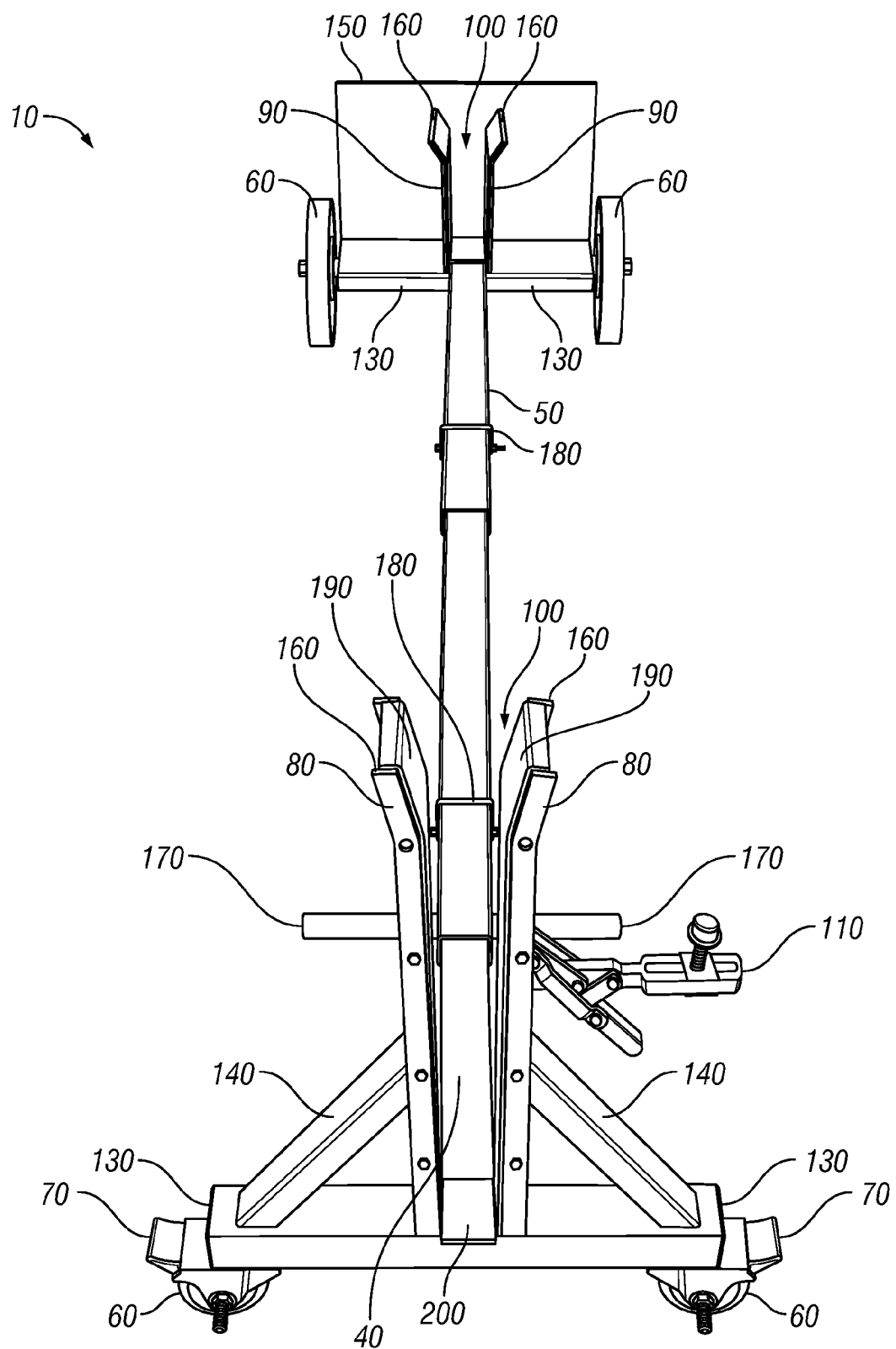
FIG. 2 is a top perspective view of the apparatus of FIG. 1.
Figure 3:
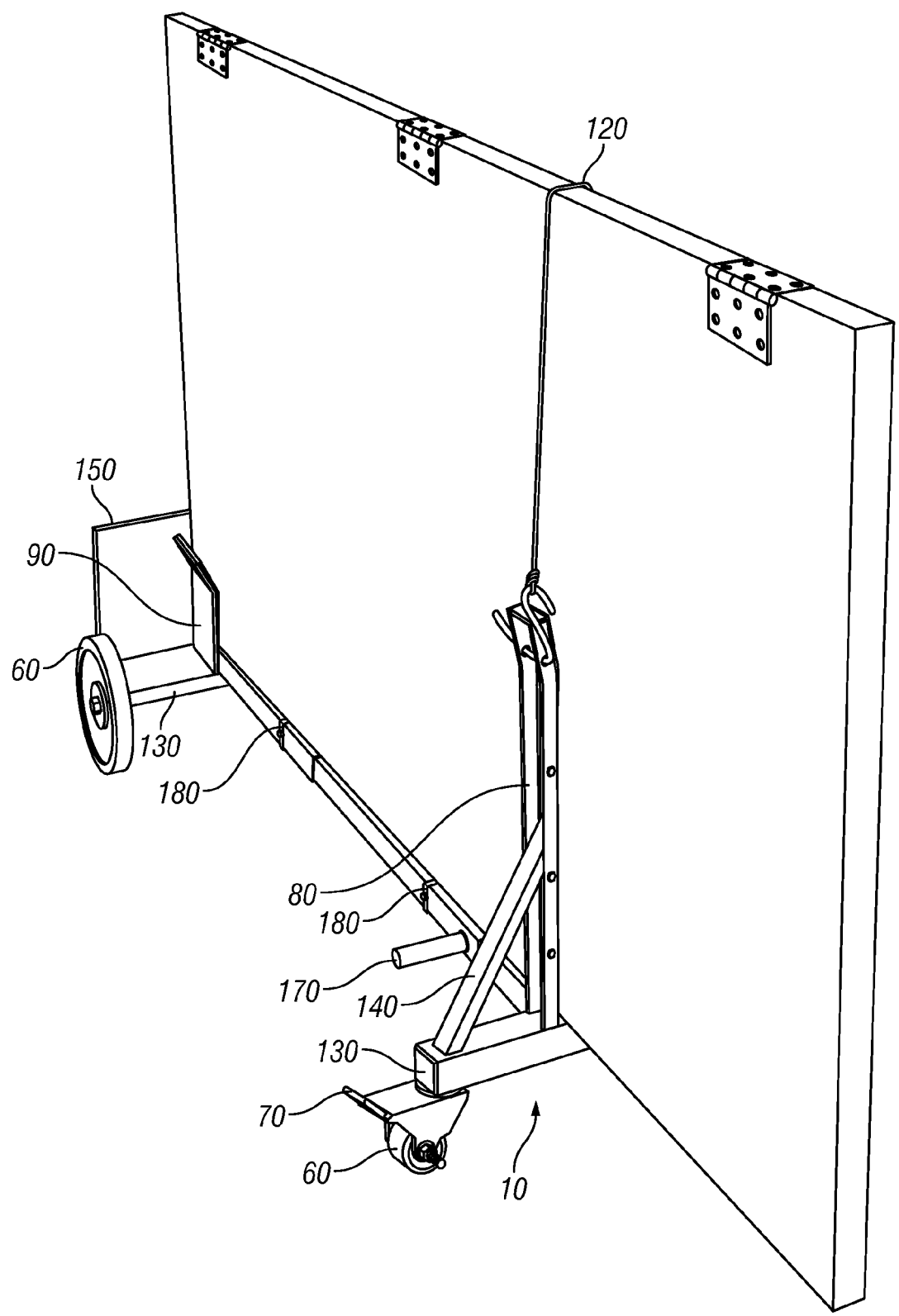
FIG. 3 is a perspective view of the apparatus of FIG. 1 holding a door while in the horizontal orientation.

To move a door, the apparatus 10 may be pivoted into its horizontal position as shown in FIGS. 2 and 3. To manipulate the apparatus 10 when it is in a vertical or semi-vertical orientation, it may be pushed or pulled with one or more handles 170 joined to the telescoping shaft 30, preferably at the lower end 50, although this is an elective feature.

In one illustrative embodiment, the upper end 40 of the frame 20 has brakes 70 (FIG. 2) for its friction-reducing members 60. These brakes 70 may be a cam lock type of latch wherein a lever operates the lock, but could be any device for stopping or slowing the rotation of the friction-reducing members 60 at the upper end 40, including any sort of single-point mechanism for locking a wheel. It is contemplated and within the scope of this disclosure that the brakes 70 could additionally or alternatively be applied to friction-reducing members 60 at the lower end 50 of the frame 20.

It will be appreciated by those skilled in the art that the horizontal orientation, depicted in FIGS. 2 and 3, assists the user when installing hinges as well as when transporting a door. When the apparatus 10 is holding a door, moved into horizontal orientation, and locked into place, it is very easy to both saw the edge of the door with a planer or router to enable it to receive recessed hinges and to screw one side of a hinge plate into the door. In this position, the door is at approximately waist-level, which minimizes the stress on the worker, as compared to the difficult performance of these tasks on a vertically-oriented door. The worker thus does not have to stretch, because the door is in a position that is more comfortably reached, requiring no bending or upward straining as with a vertical orientation which could stress the back and shoulders.

Once hinge plates have been applied to the door, the apparatus 10 can be moved to the door frame where the door is to be installed, and the apparatus 10 can be pivoted to its vertical orientation. The vertical orientation of the apparatus 10 securely holds a door for hanging or removal by one unassisted person, and the apparatus 10 and door may be positioned so that the unattached sides of the hinges abut the door jamb where they are to be attached.

In this regard, apparatus 10 has some play, meaning that the telescoped nature of the upper end 40 of the shaft 30 allows it, and therefore an upper section of the retained door as well, to very slightly rotate around the longitudinal axis of the shaft 30 and with respect to the fixed lower end 50, while still being held by the apparatus 10. This is helpful because, if the door is not precisely aligned with the door jamb, the slight rotation allows the worker to make minor adjustments so that the top hinge on the door can be fitted into the top recess cut in the jamb.

As indicated, in an illustrative embodiment, the central shaft 30 of the apparatus 10 can include telescoping portions so that it may be extended to accommodate doors of varying heights. A desired configuration is maintained by introducing a pin 180, possibly a snap or split pin, into a series of corresponding mating holes in the telescoping upper and lower ends 40 and 50 of the shaft 30. Held together by the pin 180 and holes, the shaft 30 in one embodiment may extend from five feet to six feet, nine inches in length. The telescoping movement may be such that the upper end 40 slides into and out of the lower end 50 or vice versa.

The shaft 30 may be made using three or more telescoping portions. This gives the apparatus 10 a shorter profile when the portions are in a totally-collapsed position, allowing the apparatus 10 to be packaged and shipped less expensively. One illustrative embodiment of the shaft 30 utilizes three cross-sectionally square telescoping portions: one is composed of four sides each 1.5 inches in cross-sectional length, capable of fitting within another portion which is composed of four sides each 1.75 inches in length, which in turn is capable of fitting within a third portion composed of four sides that are each 2 inches in length. If three telescoping portions are employed, an additional pin 180 and corresponding mating holes may be used to maintain the third portion in a telescoped position.

In one embodiment, the shaft 30, beams 130, struts 140, and guides 80 and 90 are composed of a metal or another rigid material sufficient to support a door weighing over one hundred pounds, and these pieces are joined by welding. The elastic strap 120 may be composed of elastic strands forming a core, covered in a woven nylon or cotton sheath as with a typical bungee cord. Material for the strap 120 strands includes synthetic rubber, such as ethylene propylene diene monomer (EPDM) rubber. The strap 120 can have metal hooks at each of its longitudinal ends for connection to the guides 80 and 90, at apertures cut therein, without the user having to tie knots.

The friction-reducing members 60 may be industrial-grade and covered with rubber treading for traction and include wheels, belts, ball-bearings, pads, tracks, or virtually any device which facilitates movement of the apparatus 10. The specific number, size, and location of the friction-reducing members 60 may vary. It is possible for the apparatus 10 to employ only one friction-reducing member 60. In one illustrative embodiment, larger wheels are rotationally connected to the outside of the lower end 50 strut 130 while smaller wheels are rotationally connected to the back of the upper end 40 of the frame 20, opposing the guides 80. Moreover, the friction-reducing members 60 may be affixed to only one end of the apparatus 10. The friction-reducing member connection is simple in nature and possible by means known to those skilled in the art, such as through axles and bearings.

Because door scratching is a concern in the art, padding 190 made of felt or another natural or artificial cloth may be adhered to the insides of the guides 80 and 90, where contact may be made with a retained door, and used to protect the door from being scuffed by the guides 80 and 90. An industrial adhesive may be used to hold the padding 190 to the guide 80 and 90. Preferably the user will want to have padded guides 80 and 90 and the retaining member 110 engage a solid part of the door, not glass. In addition, at the deep ends of the guides 80 and 90, abutting the shaft, there may be one or more rubber bumpers 200 so that the retained door does not directly contact any the frame.

Apparatus 10 allows a door to be transported when it is in a horizontal orientation. This makes it more maneuverable and less likely for the user to inadvertently run into walls or door jambs. Further, the apparatus 10 can navigate stairs due to its ability to easily switch between a vertical and horizontal orientation.

Apparatus 10 also assists when removing a door for maintenance or disposal. This is because the guides 80 and 90 can be placed around the door while the door is still in the door frame and attached to a jamb by the hinges. As the hinges are unscrewed from the jamb, and the door is freed from the jamb, there is no risk of the door accidentally falling because it is held in a vertical orientation by the guides 80 and 90.

In maintenance situations where new pockets have to be mortised into the edge of a door, the minimal size of the apparatus 10, as well as its horizontal orientation capability, can accommodate narrow or smaller doors without any shifting of the door required.

Apparatus 10 is also used to install a door. At the step where the apparatus 10 holding the door is in its vertical orientation and positioned at the desired point of installation, the worker, in the conventional manner, can lift the door so that the top hinge fits into the recess in the door jamb. The apparatus 10 may incorporate a hook or holder for a jack to lift the device.

In one illustrative embodiment, the apparatus 10 is configured to retain doors, but its construction is such that it could also be used to hold and/or transport other large sheets of material, such as plywood or drywall.

Apparatus 10 may be utilized to assist in door installation, transport, and removal. An illustrative method of using the apparatus 10 to assist with door transport begins with setting the apparatus 10 in its vertical orientation (FIGS. 2 and 3) and preferably locking the brakes 70. Then a door may be carefully positioned between the guides 80 and 90 and held in place by locking the retaining member 110 and hooking, tying, or otherwise securing the elastic strap 120. The user may transport the door by releasing the brakes 70, grasping the handles 170 or another ergonomically comfortable and safe part of the frame 20. Apparatus 10 may then be either lowered so that all friction-reducing members 60 are on the ground, or, tilted so it step plate 150 does not scrape the ground when apparatus 10 is moved.

A method for using the apparatus 10 to assist with door installation similarly requires positioning a door on the vertical, preferably braked, apparatus 10 between the guides 80 and 90; securing the door with the retaining member 110 and strap 120; putting the apparatus 10 in its horizontal orientation or tilting the apparatus 10 so that it is capable of rolling without the step plate 150 scraping the surface over which is it moving; releasing the brakes; and moving the apparatus 10 proximate to the door jamb where installation is desired. At this point, the apparatus 10 is put into the vertical orientation illustrated in FIG. 4, the brakes 70 may be re-applied, and the door is released from the retaining member 110 and strap 120 to allow the user to move and place the door in position for attachment to the jamb using means known in the art, such as screwing hinge plates to the jamb.

A method for using the apparatus 10 to assist with door removal essentially is the reverse of the process for using it to assist with door installation: placing the apparatus 10 in its vertical orientation (FIG. 4), with the brakes 70 preferably applied, in a location proximate to the door to be removed; using means known in the art such as unscrewing the screws in hinge plates, releasing the door from the jamb and sliding the door between the guides 80 and 90; securing the door to the apparatus 10 using the retaining member 110 and strap 120; putting the apparatus 10 in its horizontal orientation or tilting the apparatus 10 so that it is capable of rolling; releasing the brakes; and moving the apparatus 10, holding the door, to a desired location.

While the invention has been illustrated and described in detail in the foregoing drawings and description, the same is to be considered as illustrative and not restrictive in character, it being understood that only illustrative embodiments thereof have been shown and described and that all changes and modifications which are within the scope of the claimed subject matter are desired to be protected.

What is claimed is:

1. An apparatus for holding a door, the door defining a length, a width, and a thickness, wherein the length is greater than the width and the width is greater than the thickness, the apparatus comprising:

a telescoping frame having an upper end and a lower end, the frame being telescoping in length between its upper and lower ends so as to be able to accommodate doors of different length;

at least one pair of generally parallel guides extending outwardly from the frame and defining a gap capable of receiving the thickness of an upright door;

one or more friction-reducing members connected to the frame, the friction-reducing members comprising wheels rotationally attached to the frame, wherein at least two wheels are rotationally attached to the upper end of the frame and at least two wheels are rotationally attached to the lower end of the frame, and wherein at least one of the wheels rotationally attached to the upper end of the frame includes a brake;

one or more retaining members connected to the guides and limiting movement of the door positioned between the guides, the one or more retaining members comprising a lever operated clamp operable to releasably apply a clamping force across the thickness of the door; and a step plate at one end of, and generally orthogonal to, the frame and located such that the door positioned between the guides rests on the step plate.

2. The apparatus of claim 1 wherein the frame further comprises one or more handles.

3. The apparatus of claim 1 further comprising brakes operable to limit movement of the apparatus.

4. The apparatus of claim 1 wherein the guides are padded.

5. The apparatus of claim 1 wherein one pair of guides is attached to the upper end of the frame and another pair of guides is attached to the lower end of the frame.

6. The apparatus of claim 1 further comprising a releasable elastic strap for securing a door to the frame.

7. An apparatus for holding a door, the door defining a length, a width, and a thickness, wherein the length is greater than the width and the width is greater than the thickness, the apparatus comprising:

a telescoping frame having an upper end and a lower end, and parallel guides capable of receiving only the thickness of an upright door, the frame being telescoping in length between its upper and lower ends so as to be able to accommodate doors of different length;

one or more friction-reducing members connected to the frame, the friction-reducing members comprising wheels rotationally attached to the frame, wherein at least two wheels are rotationally attached to the upper end of the frame and at least two wheels are rotationally attached to the lower end of the frame, and wherein at least one of the wheels rotationally attached to the upper end of the frame includes a brake;

one or more retaining members connected to the guides and limiting movement of the door positioned between the guides, the one or more retaining members comprising a lever operated clamp operable to releasably apply a clamping force across the thickness of the door; and a step plate at one end of, and generally orthogonal to, the frame and located such that the door positioned between the guides rests on the step plate; and whereby the apparatus may be selectively positioned in a vertical orientation or a horizontal orientation, with at least one of the friction-reducing members being in contact with the ground in either orientation.

8. The apparatus of claim 7 wherein the guides are padded.

9. The apparatus of claim 7 wherein the frame further comprises one or more handles.

10. The apparatus of claim 7 further comprising brakes operable to limit movement of the apparatus.

11. The apparatus of claim 7 further comprising a releasable elastic strap for securing a door to the frame.

12. The apparatus of claim 7 wherein the apparatus may be selectively moved between its vertical and horizontal orientations by pivoting the apparatus about one of the friction-reducing members.

\* \* \* \* \*